United States Patent [19]

Bozich

[11] Patent Number: 5,098,962
[45] Date of Patent: Mar. 24, 1992

[54] WATER DISPERSIBLE HOT MELT ADHESIVE COMPOSITION AND APPLICATION

[76] Inventor: Frank Bozich, 273 Illinois St., Elmhurst, Ill. 60126

[21] Appl. No.: 644,223

[22] Filed: Jan. 22, 1991

Related U.S. Application Data

[63] Continuation-in-part of Ser. No. 542,580, Jun. 25, 1990, abandoned.

[51] Int. Cl.⁵ .............................................. C08F 20/00
[52] U.S. Cl. .................................. 525/437; 525/444; 525/444.5; 528/272; 528/274; 528/286; 528/293; 528/301; 524/706; 524/742; 428/481; 412/8
[58] Field of Search ............... 528/272, 274, 286, 293, 528/301; 525/437, 444, 444.5; 524/706, 742; 428/481; 412/8

[56] References Cited

U.S. PATENT DOCUMENTS

| | | | |
|---|---|---|---|
| 3,891,524 | 6/1975 | Ray-Chaudhuri et al. | 522/44 |
| 4,140,668 | 2/1979 | Sumi et al. | 524/377 |
| 4,321,341 | 3/1982 | Neuberg et al. | 525/437 |
| 4,623,688 | 11/1986 | Flanagan | 524/377 |

OTHER PUBLICATIONS

Eastman AQ® Polymers Properties and Applications p. 11.
Wingtack 10, Liquid Tackifying resin Goodyear Chemical Division, Minneapolis, MN.
Escorez 2520-Product Information and Material Safety Data Sheets, Exxon Chemicals Houston, TX.
Carbowax ®-Polyethylene Glycols, pp. 18, 21, 22, 34, 35.
Foral® AX Highly Oxidation Resistant Acidic Resin Technical Information No. 7225-9, Hercules, Inc., Resins Group Wilmington, Delaware.
TAAPI Symposium, Recyclable/Repulpable Hot Melts-A Summary-U.S.A. and Europe 1989, by Robert S. Forsyth pp. 8, 10, 11, 12, 13.

Primary Examiner—John Kight, III
Assistant Examiner—Sam A. Acquah
Attorney, Agent, or Firm—McAndrews, Held & Malloy

[57] ABSTRACT

The present invention is directed to both a water dispersible hot melt adhesive composition and to repulpable books bound using the water dispersible adhesive of the present invention. The adhesive composition of the present invention comprises:

a) from about 40% to 95% by weight of a water dispersible ionically substituted polyester resin having a molecular weight from about 10,000 to about 20,000 daltons;

b) from about 60% to about 5% by weight of one or more compatible plasticizers; and c) from about 0.1% to about 1.5% of one or more compatible stabilizers of the anti-oxidant type.

Optionally, the adhesive composition may further include one or more compatible tackifiers in a total amount up to 30% of the weight of the adhesive composition.

26 Claims, No Drawings

5,098,962

WATER DISPERSIBLE HOT MELT ADHESIVE COMPOSITION AND APPLICATION

This application is a continuation-in-part of U.S. Pat. application Ser. No. 542,580, filed on June 25, 1990, abandoned.

BACKGROUND OF THE INVENTION

A. Field Of The Invention

The present invention is directed to a water dispersible hot melt adhesive composition and to "Perfect Bound" books constructed using the adhesive.

The adhesive composition of the present invention gives excellent adhesion both to ground wood and newsprint stock, and to high quality coated stock and heavily inked paper. In addition, the water dispersible nature of the adhesive of the present invention permits the repulping of books and trimmings made using the adhesive.

B. Prior Art

In light of the increasing public concern for the conservation of limited natural resources and limits to the availability of landfill space, recycling of products derived from natural resources is of great interest and importance.

The recycling of paper and paper products represents an area of recycling which has met with some success but is not without its difficulties.

A general method for the recycling of paper is reported by the American Paper Institute in an article by R.S. Forsyth entitled "Recyclable/Repulpable Hot Melts—A Survey—USA And Europe—A Challenge," TAPPI Symposium (1989) In the disclosed method, paper is mixed with water and the fibers are separated via mechanical action similar to that of a kitchen blender. The slurry is then passed through screens and centrifugal cleaners to remove non-fibrous contaminants such as glass, metal, plastic, dirt, and other unwanted solid materials. After waste paper is repulped, it is formed into paper or paper board on the moving wire of a fourdrinier machine or on the cylinders of a cylinder machine, pressed and dried to remove the remaining water.

One of the difficulties inherent in the recycling of certain paper products is the fact that many of them contain water insoluble hot melt and pressure sensitive adhesives. These adhesives are considered the most difficult contaminants to remove from pulp fiber during the repulping process The failure to remove all of the water insoluble adhesive from the repulped paper yield papers of low quality, inconsistent composition, non-uniform appearance and non-uniform surfaces. Additionally, the sticky nature of the adhesives creates processing difficulties in the automated machinery in common use in the paper industry. The inability to effectively remove these synthetic contaminants stands as one of the major barriers to the increased recycling of paper waste.

One solution to the problem was offered by Ray-Chandhuri (U.S. Pat. No. 3,891,584) which discloses a water dispersible hot melt adhesive comprising 75-95 parts of a graft copolymer of vinyl monomer and a water soluble polyalkylene oxide polymer, and 25-5 parts of tackifying resin. A problem with the method of the '584 patent is that it is cumbersome to run, requiring reflux under a nitrogen atmosphere for 2 hours and vacuum distillation to remove residual monomer.

At present, the only hot melt adhesive for bookbinding that we know of that is both commercially viable and also water dispersible are the "animal glues". "Animal glues" are gelatin adhesives made from the hide and bone of animals. Because the animal glues are water soluble, the bookbinder, who uses them, is able to combine his book trimmings with his other paper waste and sell them for the purpose of repulping.

The problems with "animal glues" in bookbinding are twofold. First, they don't adhere well to stocks with coatings or heavy ink coverages. Secondly, they require very specialized application pots due to their high viscosities. The biggest application for animal glue is in telephone directory binding. This is because directories use predominantly ground-wood or news print paper and not higher quality stocks with heavy ink coverages and with coatings (e.g., enamels, lacquers, etc.). However, over the past few years, the U.S. publishers of directories have become more advertising conscious and have required that the higher quality papers also be bound. The demand for these higher quality papers has forced the printers and binders of directories away from the animal glues and toward the EVA and rubber-based hot melt adhesives in ever increasing amounts. However, as already pointed out, the EVA and rubber-based hot melt adhesives, which were not water dispersible, prohibit the binder from repulping his trimmings and prevent the book ultimately from being readily recycled It is an object of the present invention to formulate a water dispersible adhesive composition that is capable of effectively binding both to ground-wood or news print paper and to paper stocks with coatings and/or heavy ink coverages.

Telephone directories, particularly directories located at outdoor telephones, present a unique variety of problems These directories occasionally hang in a phone booth with their back (binding side) up and the pages hanging down. When hanging in this fashion, the pages are subject to the constant downward pull of gravity under a variety of weather conditions, including heat and high humidity. The combined conditions of heat and high humidity are particularly adverse for a water dispersible hot melt adhesive composition. It is an object of the present invention to provide a water dispersible hot melt adhesive composition that is capable of functioning reasonably well under conditions of heat and high humidity.

SUMMARY OF THE INVENTION

The present invention is directed both to a water dispersible hot melt adhesive composition and to a repulpable book bound using the water dispersible adhesive composition. The adhesive composition of the present invention exhibits good tensile strength, page pull, and page flex values, binds well to newsprint and coated stocks, is humidity resistent and is water dispersible. These properties make the adhesive composition of the present invention particularly useful for the perfect binding of repulpable books using both news print paper and high quality coated stocks The water dispersible adhesive composition of the present invention comprises:

a) from about 40% to about 95% by weight of a water dispersible ionically substituted, polyester resin having a molecular weight from about 10,000 to about 20,000 daltons;

b) from about 60% to about 5% by weight of one or more compatible plasticizers; and c) from about 0.1% to about 1.5% of one or more compatible stabilizers.

Optionally, the adhesive composition of the present invention may further contain one or more compatible tackifiers in a total amount up to 30% of the weight of the adhesive composition.

The present invention also encompasses a repulpable perfect bound book comprising a cover, one or more signatures and the adhesive described above for binding the cover to the one or more signatures in a recyclable manner.

DETAILED DESCRIPTION OF THE INVENTION

The present invention has two aspects. In its first aspect, it is directed to a water dispersible hot melt adhesive composition that is suitable for the preparation of repulpable books. The water dispersible hot melt adhesive composition of the present invention comprises:

a) from about 40% to about 95% by weight of a water dispersible ionically substituted polyester resin having a molecular weight from about 10,000 to about 20,000 daltons;

b) from about 60% to about 5% by weight of one or more compatible plasticizers; and c) from about 0.1% to 1.5% of one or more compatible stabilizers.

Optionally, the adhesive composition may further contain one or more compatible tackifiers comprising up to 30% of the weight of the composition. To increase the resistance of the adhesive composition to the effects of heat and humidity, a hydrophobic plasticizer is preferably employed.

The water dispersible ionically substituted polyester resin component of the adhesive composition is composed of a chain of alternating units of an aromatic dicarboxylic acid ("A") and an aliphatic or cyclo-aliphatic glycol ("G") in sufficient numbers to approximate the average molecular weight range of the polyester resin molecule A sufficient number of the dicarboxylic acid moieties ("A") in the polyester resin are randomly substituted with a water ionizable species ("X") to render the polyester resin and adhesive composition water dispersible. Preferably, an average of at least 5 of the dicarboxylic acid moieties in any resin molecule are ionically substituted, more preferably from 5 to about 8. Consistent with the above description, a segment of the polyester resin component is schematically represented as Formula I:

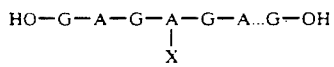

wherein A and G are as described above; wherein -OH is a terminal hydroxyl group; wherein X is a water ionizable moiety such as $-SO_3Y$, and wherein Y is a water soluble cation such as $Li^+$, $Na^+$, $K^+$, $NH_4^+$ and the like or a mixture thereof. Although X is described as $-SO_3Y$, we know of no reason why $-PO_3Y_2$ would not be similarly effective as a water ionizable species.

The preferred polyester resin of the present invention has a molecular weight ranging from about 14,000 to about 18,000 daltons. The most preferred polyester resin for the present invention has a molecular weight of approximately 16,000 daltons, and is commercially available as a solid polymer under the tradename Eastman AQ29S from Eastman Chemicals (Kingsport, Tennessee). Eastman AQ29S has a hydroxyl number of less than 10, an acid number of less than 2, a glass transition temperature of 29° C., and a melt viscosity of 2,000 poise at 200° C.

Plasticizers are suited for use in the present invention (i.e., are "compatible") if they are water soluble or dispersible, or they do not adversely affect the water dispersibility of the adhesive composition of the present invention. Suitable plasticizers include the various low molecular weight polyethylene glycols and/or glycol ethers, glycerin and the like. By the term "low molecular weight" as used in conjunction with the polyethylene glycols and/or glycol ethers is meant a glycol and/or glycol ether having an average molecular weight falling within the range from about 200 to about 600. Preferred plasticizers are polyethylene glycol 300 (PEG 300) having an average molecular weight of from about 285 to 315 daltons and polyethylene glycol 400 (PEG 400) having an average molecular weight from about 380–420 daltons. A particularly preferred plasticizer is a combination of PEG 300 and PEG 400 most preferably, in a weight ratio of about 1 to about 8 respectively. Polyethylene glycols are commercially available under the trade name Carbowax ® from Dow Chemical Co., Midland, Michigan. The above plasticizer combination is suitable for use in most situations, including high humidity, wherein the pages of the perfect bound book are not subject to constant pulling. However, for high humidity situations (about 50% of relative humidity) at elevated temperatures (about 90° F.), wherein the adhesive is under constant stress, such as by the pages of a telephone book when hanged, it is preferred that at least one of the plasticizers be a relatively hydrophobic plasticizer. A particularly preferred hydrophobic plasticizer is butyl benzyl phthalate [i.e., 1,2-benzenedicarboxylic acid butyl phenylmethyl ester]. This plasticizer is commercially available under the tradename Santicizer ® 160 from Monsanto Company, St. Louis, Missouri 63167.

The adhesive composition of the present invention also comprises from about 0.1% to about 1.5% of one or more stabilizers. Preferred stabilizers are of the anti-oxidant type. Generally these anti-oxidants are members of the group consisting of high molecular weight sterically hindered phenols or sulfur or phosphorous substituted phenols. By "sterically hindered phenols" is generally meant those phenols with two isopropyl or preferably tertiary butyl groups ortho to the phenolic hydroxyl groups. Representative "sterically hindered phenols" include but are not limited to 1,3,5-trimethyl-2,4,6-tris(3,5-di-t-butyl-4-hydroxybenzyl)benzene; pentaerythrityl tetra-kis-3(3,5-di-tertbutyl-4-hydroxyphenyl)-propionate; n-octadecyl 3-(3,5-di-tertbutyl-4-hydroxyphenyl)-propionate;4,4'-methylenebis(2,6-tert-butylphenol); 4,4'-thiobis(6-tert-butyl-o-cresol); 2,6-di-tert-butylphenol; 6-(4-hydroxyphenoxy)-2,4-bis(n-octylthio)-1,3,5-triazine; di-n-octadecyl 3,5-di-tert-butyl-4-hydroxybenzylphosphorate; 2-(n-octylthio)ethyl 3,5-di-tert-butyl-4-hydroxybenzoate; and sorbitol hexa[3-(3,5-di-tert-butyl-4-hydroxyphenyl)propionate].

An especially preferred anti-oxidant is pentaerythritol tetrakis-3-(3,5-di-tertiarybutyl-4-hydroxyphenyl) propionatewhich is available from Ciba-Geigy under the tradename Irganox 1010. (Hawthorne, New York) However, any other compatible anti-oxidant or combination of anti-oxidants may be used without departing from the scope of the invention.

The adhesive composition of the present invention may optionally include one or more compatible tackifying resins. The decision to employ a tackifying resin is application dependent. Typically, the tackifying resin functions either to impart rigidity or as a diluent to lower the adhesives cost. Suitable tackifying resins include wood rosin, gum rosin, tall oil rosin, and the acidic resins such as those produced by the hydrogenation of wood rosin. A preferred tackifying resin is the acidic resin that is produced by hydrogenating wood rosin to an exceptionally high degree and which is commercially available from Hercules, Inc. (Wilmington DE) under the tradename FORAL® AX. This tackifying resin has a softening point of 74° C. (Hercules drop method), an acid number of 158, a refractive index at 100° C. of 1.4970.

It is also within the scope of the present invention to add from about 0.5-5% by weight of one or more colorants, dyes or pigments to the adhesive composition of the present invention. For example, for a white adhesive, from about 4-5% titanium dioxide (TiO$_2$) is added.

A preferred water dispersible adhesive composition of the present invention comprises:
a) from about 75% to about 80% by weight of a water dispersible ionically substituted, polyester resin having an average molecular weight from about 14,000 to about 18,000 daltons;
b) from about 1.0% to about 20% by weight of one or more compatible plasticizers; and
c) from about 0.1% to about 1.5% of one or more compatible stabilizers.

More preferably, the adhesive composition of the present invention further includes up to about 15% by weight of one or more compatible tackifiers.

The present invention is also directed to an improved perfect bound book. The conventional perfect bound book comprises one or more signatures, a cover, and an animal glue or hot melt adhesive for binding the cover to the signatures. In the improved perfect bound book of the present invention, the improvement comprises employing the water dispersible hot melt adhesive of the present invention for binding a cover to one or more signatures to produce a perfect bound book that cannot only utilize high quality stock with coatings but which is ultimately repulpable.

The basic process for perfect binding books is disclosed in U.S. Pat. No. 3,891,584 and is hereby incorporated herein by reference.

In order for an adhesive to be utilized as a component in a perfect bound book, it must demonstrate good tensile strength, good page pull strength, the ability to bond to both newspaper and enameled, inked or lacquered papers, flexibility, and humidity resistance.

Examples of the efficacy of the water dispersible hot melt adhesive of the present invention follows. Sample No. 1, which was prepared according to the procedure of Example 1 infra, represents an embodiment of the present invention.

| Sample #1 | |
| --- | --- |
| | % by wt |
| Eastman AQ29S | 78.25 |
| Dow PEG300 | 1.08 |
| Dow PEG400 | 7.62 |
| Hercules Foral AX | 12.60 |
| Ciba Gigy Irganox 1010 | .45 |

| -continued | |
| --- | --- |
| Sample #1 | |
| | % by wt |
| | 100.00 |

This product (Sample #1) gave excellent adhesion both to enamel stock signatures and to solid ink and varnished covers. Moreover, it exhibited a viscosity and setting speed very similar to a traditional non-dispersible book binding adhesive. This allows it to be run on binders interchangeably with EVA and rubber-based hot melts.

Sample #1 was also compared to a hot melt adhesive of the water insoluble type in terms of tensile strength, elongation and yield point. (Table 1).

TABLE 1

| | Sample #1 | Sample #2 |
| --- | --- | --- |
| Peak Tensile | 13 Newtons | 22.6 Newtons |
| Elongation | 11.3 cm | 9.0 cm |
| | (1130%) | (900%) |
| Yield Point | 13 Newtons | 6.7 Newtons |

Table shows that the adhesive of the present invention has tensile strength and elongation values similar to a commercially available hot melt adhesive of the water insoluble type.

In another test, the preferred adhesive composition of the present invention (Sample #1) was also compared to a water soluble animal glue for both page pull value and page flex values. Specifically, Sample #1 was tested on a ½ inch thick phone book that had 60 lb. enamel inserts. The cover stock was printed with solid red-ink and had a lacquer coating over the ink. Books were bound at 3500 bph on a Sheridan XP binder. The adhesive temperature was 350° F. The books were evaluated in terms of their page pull values, page flex values, and humidity resistance. The page pulls and flexes were evaluated on a J.E. Plunket page flex tester. Page pulls and flexes were run on two phone books bound with animal glue, one book being ¾ inch thick and the other, ½ inch thick. The books bound with animal glue contained only newsprint pages because the animal glue adheres very poorly to enamel coated pages. The results are shown in Table 2.

TABLE 2

| | ½" Sample #1 | ½" Animal Glue | ¾" Animal Glue |
| --- | --- | --- | --- |
| Page Pulls Avg. | | | |
| Newsprint | 40.1 lb. | 26 lb. | 31 lb. |
| Enamel | 55.5 | N/A | N/A |
| Page Flexes | (70 cycles/min) | | |
| Newsprint | over 500 | over 500 | over 500 |
| Enamel | over 500 | N/A | N/A |

As shown in Table 2, both the adhesive of the present invention and animal glues have similar page flex values. However, the adhesive of the present invention has superior page pull values when compared to animal glues. In addition, the adhesive of the present invention has the advantage of giving good page pull and flex values using enamel coated papers to which animal glue does not effectively adhere.

In Table 3, the ½ inch book that had been bound with Sample #1 (½1) was compared to the ½ inch book that had been bound with animal glue ("½" Animal Glue) for "humidity resistance." The above books were aged for 72 hrs at 77° F. and 79% relative humidity in a closed container that had a saturated NH₄H solution in the bottom in order to treat their humidity resistance.

TABLE 3

|  | Sample #1 | Animal Glue |
|---|---|---|
| Page Pulls |  |  |
| Newsprint | 39.75 lbs. | 28 lbs. |
| Enamel | 70 lbs. | N/A |
| Page Flexes |  |  |
| Newsprint | over 500 | over 500 |
| Enamel | over 500 | N/A |

The results in Table 3 show that books bound with the adhesive of the present invention have a higher humidity resistance than books bound with animal glues. Finally, the books described above were evaluated for their overall repulpability. In particular, a book bound with animal glue and one bound with Sample No. 1 were placed in a 77° F. water bath of neutral pH. The time until the adhesive broke apart and the pages came free was measured for each book and recorded in Table 4.

TABLE 4

| Sample #1 | Animal Glue |
|---|---|
| <5 min | <5 min |

The results in Table 4 show that the adhesive of the present invention has a similar water solubility to animal glues and hence is similarly repulpable.

By proper selection of a plasticizer, the adhesive composition of the present invention is capable of being made resistant to page loss due to page pull when exposed to high humidity at high temperatures. In this embodiment, the adhesive composition employs a hydrophobic plasticizer as at least one of the plasticizers in the composition. The hydrophobic plasticizer comprises from about 2% to about 10% by weight of the adhesive composition; more preferably, from about 4% to about 6% by weight of the composition. An especially preferred hydrophobic plasticizer is Santicizer 160.

A preferred water dispersible adhesive composition that exhibits increased resistance to page loss at high humidity comprises:
a) from about 45% to about 65% by weight of a water dispersible ionically substituted polyester resin having a molecular weight from about 10,000 to about 20,000 daltons;
b) from about 3% to about 10% by weight of a compatible hydrophobic plasticizer, and from about 2% to about 5% by weight of one or more low molecular weight polyethylene glycols;
c) from about 30% to about 20% by weight of one or more compatible tackifiers; and
d) from about 0.1% to about 1.5% by weight of one or more compatible stabilizers of the antioxidant type.

It is also within the scope of the present invention that the adhesive composition further contain from about 6% to about 14% by weight of a second polyester having a molecular weight of less than 10,000 daltons, particularly where greater humidity resistance is required. A particularly preferred polyester is available from Hüls Aktiengesellschaft as Dynacoll ® 7340, a partially crystalline copolyester having a molecular weight of approximately 3500, a hydroxyl number of from about 27-34, and an acid number of <2.

A particularly preferred water dispersible adhesive composition that has increased humidity resistance was prepared as in Example 2 and has the overall composition noted in Sample #4.

| Sample #4 |  |
|---|---|
|  | % by Wt. |
| Eastman AQ29S | 53.0 |
| Santicizer 160 | 4.4 |
| PEG 600 | 2.73 |
| Foral AX | 23.47 |
| Dynacol 7340 | 10.43 |
| Irganox 1010 | 0.6 |
| Tatanium dioxide (an optional pigment) | 4.37 |

The adhesive compositions of Examples 1 and 2 were compared to determine their resistance to humidity when used in telephone directories that were subject to hanging by their bindings. In particular, a first set consisting of two identical telephone directories was "perfect bound" with the water dispersible adhesive composition of Example 1. A second set consisting of two identical telephone directories was perfect bound with the water dispersible adhesive composition of Example 2, which had hydrophobic plasticizer. The four directories were then subjected to extreme heat and humidity conditions. Specifically, all four directories were supported in a hanging position by a rod running lengthwise through the middle of each book. The support simulated how telephone directories are sometimes held in public phone booths, wherein the constant downward pull on the pages by gravity tests the overall strength of the adhesive used in the binding. In the present test, the four directories on the rods were enclosed in a chamber in which both the temperature and the humidity were controlled. The four supported books were first subjected to a temperature of 120° F. at 30% relative humidity. After twenty-four hours, one of the books (book #1) that was perfect bound with the adhesive composition of Example 1 lost approximately 50% of its pages. Thereafter, the relative humidity in the chamber was increased to 40% while the temperature was maintained at 120° F. After 4.5 hours at 40% relative humidity, book #1 lost 100% of its pages; a second book (book #2) of the first set lost approximately 50% of its pages. After twenty-three hours at 40% relative humidity and 120° F., book #2 lost 100% of its pages. Only the two books of the second set that were prepared with the adhesive composition of Example 2 remained intact.

Upon completion of 24 hours at 120° F. and at 40% relative humidity, the relative humidity in the test chamber was increased to 50%. After 22 hours at 50% relative humidity, one of the books (book #3) that was prepared with the adhesive composition of Example 2 lost 40% of its pages. The other book in the set (book #4) remained intact. Upon completion of 24 hours at 50% relative humidity and 120° F., no further damage to book #3 was observed, and book #4 remained intact.

It is not possible for a water dispersible hot melt adhesive composition to be completely unaffected by extremes of humidity and temperature, otherwise it would not be water dispersible. However, the water dispersible adhesive composition of Example 2 exhibits significant resistance to loss of adhesion even in heat and humidity extremes such as might be found for short duration in the environment (e.g., 120° F. at 40% relative humidity), and even when subject to constant stress for days such as the downward pull of gravity.

Hence, the water dispersible adhesive composition of the present invention encompasses embodiments, such as Example 1, which is suitable for use in most situations wherein constant stress and high humidity are not factors to embodiments such as Example 2, which is suitable for use in most situations including those wherein constant stress and high humidity are indeed significant factors.

DESCRIPTION OF THE PREFERRED EMBODIMENT

EXAMPLE 1

Preparation of a water Dispersible Hot Melt Adhesive Composition

To a clean reaction vessel (Kettle) heated to between 300°-350° F. was added 100 parts per 100 by weight (hereinafter "parts") of polyethylene glycol 300 (PEG 300), 7.62 parts of polyethylene glycol 400 (PEG 400), and 0.45 parts of Irganox 1010. While maintaining the temperature at from about 300°-350° F., 25 parts of Eastman AQ29S was added with mixing until the mixture became smooth. When smooth, another 25 parts of Eastman AQ29S was added with mixing until smooth. The step was repeated again. Finally, 3.25 parts of Eastman AQ29S was added to the heated (300°-350° F.) reaction mixture with stirring until smooth. (A total of 78.25 parts of Eastman AQ29S was added to the reaction mixture.) Thereafter, 12.6 parts of Floral AX was added to the heated mixture with stirring until homogeneous. The resultant product was poured into a release coated box (preferably silicon coated, such as disclosed in U.S. Pat. No. 4,148,429 which is incorporated by reference, and which is commercially available from Menasha Corp. Menasha, WI.).

The resultant water dispersible hot melt adhesive was prepared for application by reheating to between 300°-375° F. To preclude degradation, the adhesive should not be maintained at this temperature for longer than 24 hours.

EXAMPLE 2

Preparation of a Water Dispersible Hot Melt Adhesive Composition With Increased Humidity Resistance To a heated vessel at 300° F., add the following ingredients with mixing: 2.73 parts per 100 by weight, (hereinafter "parts") of polyethylene glycol 600 (PEG 600), 2.73 parts of Santicizer 160, 4.37 parts of the pigment titanium dioxide (an optional ingredient for imparting a white color); 18 parts of Foral AX (a tackifier); 0.6 parts of Irganox 1010 (an anti-oxidant); and 53 parts of Eastman AQ29S. The mixture of ingredients was mixed until smooth.

Then, the following ingredients were added to the mixture: 5.47 parts Foral AX; 10.43 parts Dynacol 7340, and 1.67 parts of Santicizer 160. The mixture was again mixed until smooth to yield a water dispersible hot melt adhesive composition. The resulting adhesive composition has the following viscosities.
@380° F.=3000 cps
@330° F.=4250 cps.

What is claimed is:

1. A water dispersible hot melt adhesive composition comprising:

a) from about 40% to about 95% by weight of a water dispersible ionically substituted polyester resin having a molecular weight from about 10,000 to about 20,000 daltons;

b) from about 60% to about 5% by weight of one or more compatible plasticizers; and c) from about 0.1% to about 1.5% of one or more compatible stabilizers.

2. The adhesive composition of claim 1 wherein said polyester resin has a molecular weight from about 14,000 to about 18,000 daltons.

3. The adhesive composition of claim wherein said ionically substituted polyester resin is of the

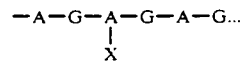

type wherein A is an aromatic dicarboxylic acid moiety, G is an aliphatic or cyclo-aliphatic glycol residue, X represents a sufficient number of randomly distributed ionizable moieties per resin molecule to render the adhesive composition water dispersible.

4. The adhesive composition of claim 3 wherein X is an $—SO_3Y$ moiety and wherein Y is a water soluble cation.

5. The adhesive composition of claim 4 wherein said cation is a member of the group consisting of $Li^+$, $Na^+$, $K^+$, $NH_4^+$, and combinations thereof.

6. The adhesive composition of claim 5 wherein said cation is sodium.

7. The adhesive composition of claim 6 wherein said ionically substituted polyester resin has from about 5 to about 8 X moieties per molecule.

8. The adhesive composition of claim 7 wherein said ionically substituted polyester resin comprises from about 75% to about 85% by weight of said composition.

9. The adhesive composition of claim 3 wherein said plasticizer is a member of the group consisting of one or more low molecular weight polyethylene glycols, one or more low molecular weight glycol ethers, glycerin, butyl benzyl phthalate and mixtures thereof.

10. The adhesive composition of claim 9 wherein said plasticizer comprises a first polyethylene glycol having an average molecular weight of from about 285 to about 315 daltons and a second polyethylene glycol having an average molecular weight of from about 380 to about 420 daltons.

11. The adhesive composition of claim 10 wherein said first polyethylene glycol comprises about 1% of the composition by weight and said second polyethylene glycol comprises from about 7% to about 8% of the composition by weight.

12. The adhesive composition of claim 1 wherein said compatible stabilizer comprises one or more members of the group consisting of sterically hindered phenols, sulphur substituted phenols, phosphorus substitute phenols, and mixtures thereof.

13. The adhesive composition of claim 1 further containing one or more compatible tackifiers in an amount up to 30% by weight of the adhesive composition.

14. The adhesive composition of claim 13 wherein said compatible tackifier comprises one or more members of the group consisting of wood rosin, gum rosin, tall oil rosin, and resin acid.

15. A water dispersible hot melt adhesive composition comprising:

a) from about 80% to about 90% by weight of a water dispersible ionically substituted polyester resin having a molecular weight from about 14,000 to about 18,000 daltons;
b) from about 20% to about 10% by weight of one or more compatible plasticizers; and
c) from about 0.1% to about 1.5% by weight of one or more compatible stabilizers.

16. A water dispersible hot melt adhesive composition comprising:
a) from about 45% to about 65% by weight of a water dispersible ionically substituted polyester resin having a molecular weight from about 10,000 to about 20,000 daltons;
b) from about 30% to about 10% by weight of a compatible hydrophobic plasticizer, and from about 2% to about 5% by weight of one or more low molecular weight polyethylene glycols;
c) from about 30% to about 20% by weight of one or more compatible tackifiers; and
d) from about 0.1% to about 1.5% by weight of one or more compatible stabilizers of the anti-oxidant type.

17. The water dispersible adhesive composition of claim 16 further comprising from about 6% to about 14% by weight of a second polyester having an average molecular weight of less than 10,000 daltons.

18. The water dispersible adhesive composition of claim 17 wherein the average molecular weight of said second polyester is approximately 3500 daltons.

19. The water dispersible adhesive composition of claim 17 wherein the hydrophobic plasticizer is butyl benzyl phthalate.

20. In a perfect bound book comprising one or more signatures, a cover, and an animal glue or water insoluble hot melt adhesive for binding said signatures to said cover, the improvement comprising said adhesive comprising the water dispersible adhesive composition of claim 1 whereby said perfect bound book is rendered repulpable.

21. In a perfect bound book comprising one or more signatures, a cover, and an animal glue or water insoluble hot melt adhesive for binding said signatures to said cover, the improvement comprising said adhesive comprising the water dispersible adhesive composition of claim 19 whereby said perfect bound book is rendered repulpable.

22. In a perfect bound book comprising one or more signatures, a cover, and animal glue or water insoluble hot melt adhesive for binding said signatures to said cover, the improvement comprising substituting for said adhesive a water dispersible hot melt adhesive comprising:
a) from about 80% to about 90% by weight of a water dispersible ionically substituted polyester resin having a molecular weight from about 14,000 to about 18,000 daltons;
b) from about 20% to about 10% by weight of one or more compatible plasticizers; and
c) from about 0.1% to about 1.5% by weight of one or more compatible stabilizers of the anti-oxidant type.

23. The perfect bound book of claim 22 wherein said water dispersible hot melt adhesive composition further contains up to about 15% by weight of one or more compatible tackifiers.

24. The perfect bound book of claim 23 wherein said compatible plasticizer is a member of the group consisting of one or more low molecular weight polyethylene glycols, one or more low molecular weight glycol ethers, glycerin, butyl benzyl phthalate, and mixtures thereof.

25. The perfect bound book of claim 24 wherein said compatible stabilizer is a sterically hindered phenol.

26. The perfect bound book of claim 25 wherein said tackifier is one or more members of the group consisting of wood rosin, tall oil rosin, gum rosin, and resin acid.

* * * * *